United States Patent [19]
Kersten et al.

[11] Patent Number: 6,123,095
[45] Date of Patent: Sep. 26, 2000

[54] VACUUM BREAKER WITH BUOYANT FLOAT CUP

[75] Inventors: Steven Allen Kersten, Chicago; Robert Joseph Centner, Matteson, both of Ill.

[73] Assignee: WaterSaver Faucet Co., Chicago, Ill.

[21] Appl. No.: 09/076,527

[22] Filed: May 12, 1998

[51] Int. Cl.[7] .................................................. E03C 1/10
[52] U.S. Cl. ......................................... 137/218; 137/47
[58] Field of Search ..................................... 137/217, 218

[56] References Cited

U.S. PATENT DOCUMENTS

| | | | |
|---|---|---|---|
| 2,303,037 | 11/1942 | Fredrickson | 137/218 |
| 2,325,956 | 8/1943 | Holtman | 137/218 |
| 2,590,386 | 3/1952 | Dobrick | 137/218 |
| 2,814,304 | 11/1957 | Sloan . | |
| 3,180,352 | 4/1965 | Kersten et al. | 137/218 |
| 3,454,032 | 7/1969 | Hinz et al. . | |
| 3,470,898 | 10/1969 | Langdon | 137/218 |
| 3,565,097 | 2/1971 | Costa et al. . | |
| 3,788,342 | 1/1974 | Milette et al. | 137/218 |
| 5,360,029 | 11/1994 | Groughneour . | |
| 5,685,330 | 11/1997 | Breda | 137/218 |

Primary Examiner—Gerald A. Michalsky
Attorney, Agent, or Firm—Wallenstein & Wagner, Ltd.

[57] ABSTRACT

A vacuum breaker for use in a fluid supply system is provided. The vacuum breaker comprises a body having an interior, a fluid inlet, a fluid outlet, and an atmospheric air vent. The body is adapted to permit fluid to flow through the interior from the fluid inlet to the fluid outlet. A first seat disposed within the interior of the body. A bonnet having a second seat communicates with the air vent and the interior. A displacable float cup is disposed between the bonnet and the first seat. The float cup adapted to be sealingly seated against the second seat when the vacuum breaker is subject to an open flow condition, and to be sealingly seated against the first seat when the vacuum breaker encounters a pressure loss condition. Gaskets are provided to enhance the seal at the first and second seats. Both seats are above a water level within the body of the vacuum breaker. At the open flow condition the float cup seals the air vent and at the pressure loss condition the float cup opens the air vent. A float cup for use in a vacuum breaker is also provided. The float cup comprises a bottom portion and a top portion sonically welded to the bottom portion. An air pocket is contained within the float cup. A shroud may be attached to the float cup about the periphery of the float cup. The air pocket is positioned so that at least a portion of the air pocket is below the shroud.

23 Claims, 3 Drawing Sheets

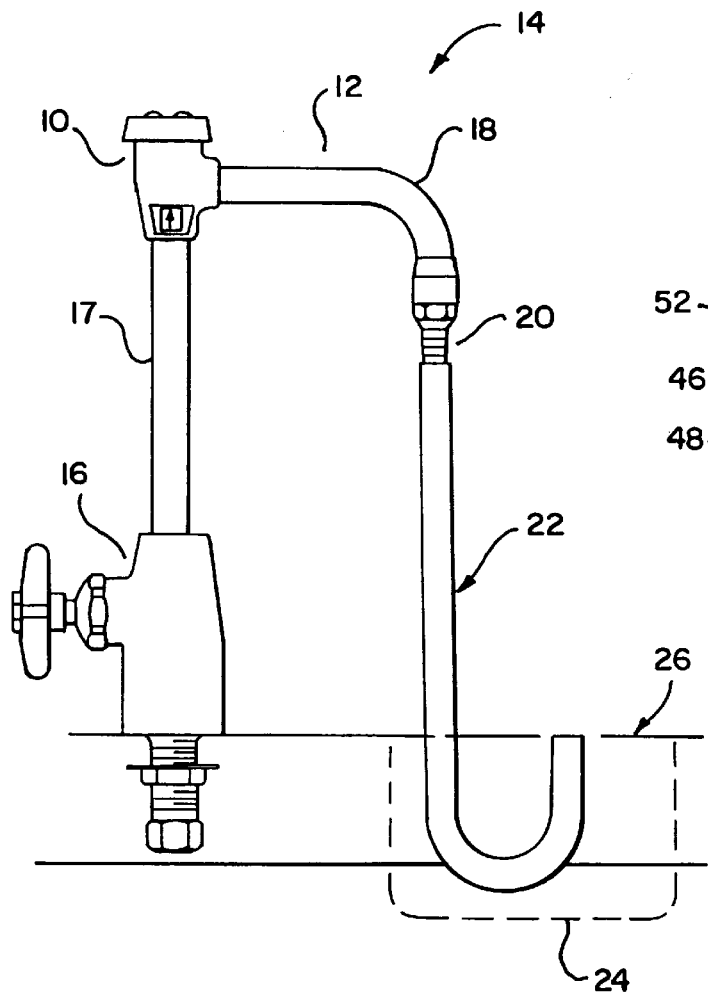
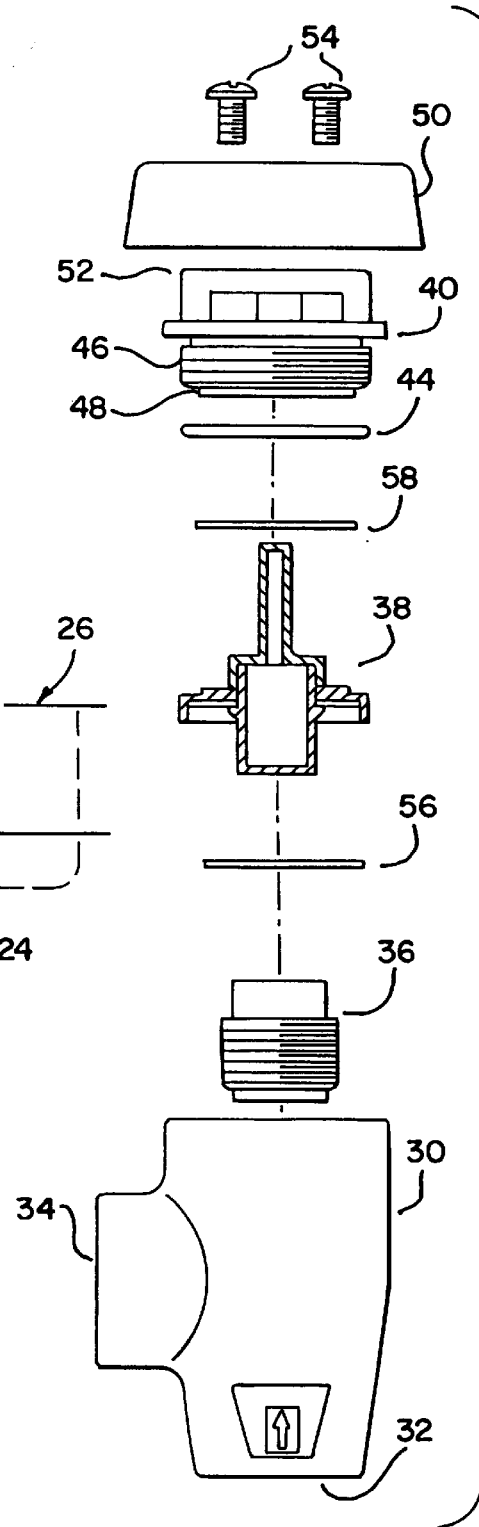

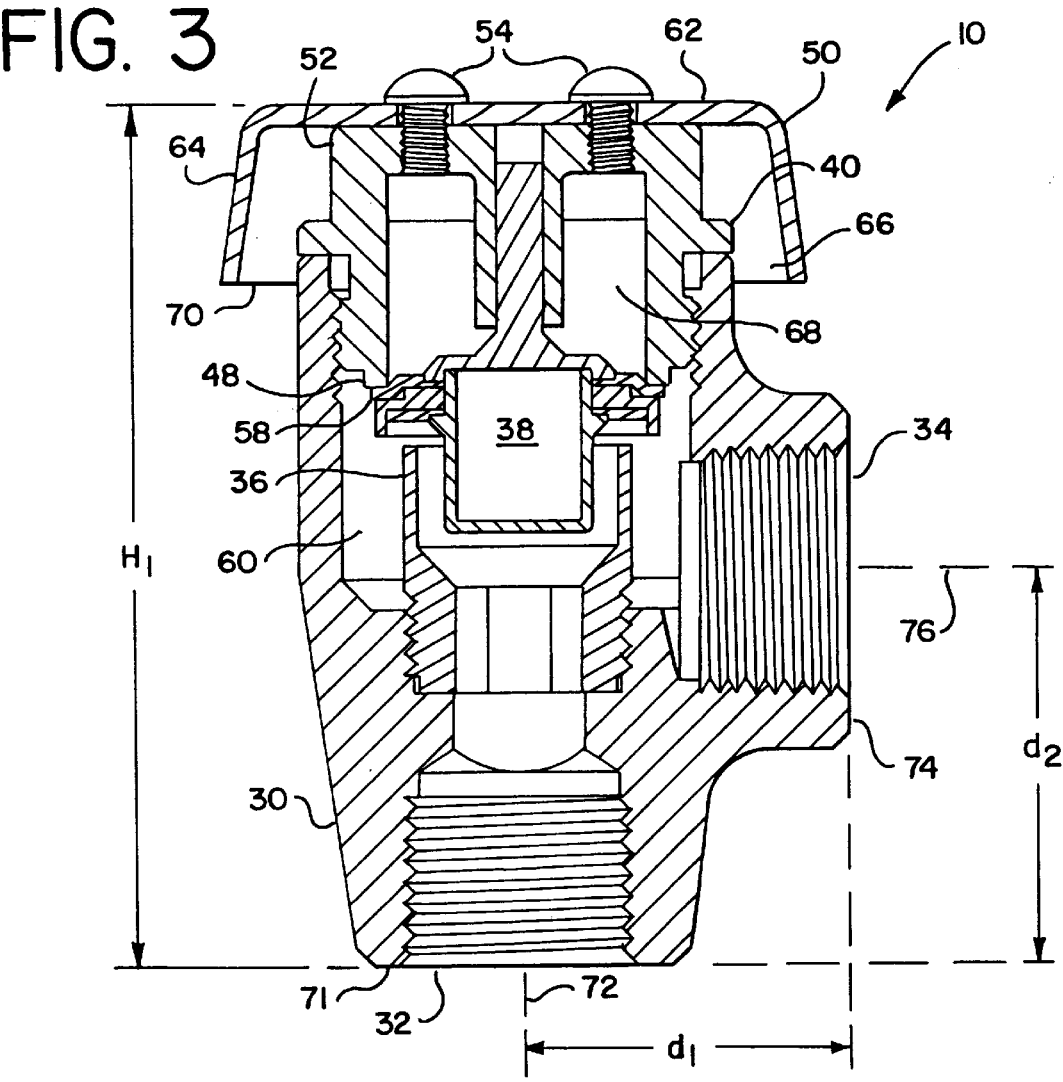

VACUUM BREAKER WITH BUOYANT FLOAT CUP

TECHNICAL FIELD

The present invention relates to vacuum breakers used in fluid supply systems such as water lines.

BACKGROUND OF THE INVENTION

Vacuum breakers are used in fluid supply systems and, in particular, in potable water systems to eliminate or lower the probability of back-siphonage at the discharge side of such systems. Vacuum breakers are particularly useful in conjunction with laboratory faucets and valves that are part of a potable water system to prevent contaminated water from being siphoned back into the water system. In many laboratory procedures, one end of a flexible hose or tubing is attached to an outlet fitting of the faucet or valve, such as a serrated nozzle, while the other free end rests in a sink. The concern is that in the event of a loss of water pressure—due, for example, to a pipe breaking or a sudden large demand in the water lines elsewhere in the system—a siphon will be created in the faucet and contaminants in the sink will be drawn up through the hose or tubing and into the potable water system. A vacuum breaker is employed to prevent the back-siphonage from occurring. In a typical application, the vacuum breaker is an integral part of the gooseneck of a faucet and contains some type of valve means. In another typical application, the vacuum breaker is installed in the piping within a fume hood or cabinet between a water valve and an outlet fitting. In either application, when the faucet or valve is opened the vacuum breaker permits water to flow therethrough. When there is a loss of water pressure, however, the vacuum breaker closes off the upstream line and permits air to enter the downstream line to break any vacuum created.

One problem presented by vacuum breakers of the prior art occurs during many common laboratory procedures that require low water flow through the gooseneck. Under low flow conditions, vacuum breakers tend to leak out the air vents. One reason for the occurrence of leaking is that many vacuum breakers contain an internal float valve body which is not capable of maintaining proper seating over abroad range of flow rates, either because the float valve body is not sufficiently buoyant or is permitted excessive freedom of movability. Buildup of calcium or mineral deposits and other types of fouling of the float valve body can exacerbate this problem.

In the prior art, hollow float valve bodies have been constructed by threading two or more components together. In such float valve bodies the integrity of the seal at the threads, or the tightness of the threaded connection, has never been ensured, even where gaskets or other seals are employed to protect the threads. Both the threads and their seals are subject over time to degradation, fouling, dilation and expansion under different flow conditions or fluid temperatures. The risk of occurrence of such problems increases especially where the pressure within the hollow float valve body differs from the pressure surrounding the valve body. Air contained within the valve body, which contributes to its buoyancy, may escape through the spaces between the mated threads and may be replaced with water seeping into the valve body, thereby weighing the valve body down and severely reducing its buoyancy.

In an attempt to restrict the degree of movement of float valve bodies and maintain proper seating, vacuum breakers of the prior art have been provided with internal tubular members in which the float valve bodies are disposed. One example of such a vacuum breaker is an embodiment disclosed in U.S. Pat. No. 2,814,304, issued to Sloan. The valve body disclosed in Sloan is provided with a plurality of ribs or wings that extend radially outward from the valve body toward the tubular member. This configuration unnecessarily adds complexity to the vacuum breaker, increases the weight of the valve body, and escalates assembly and component cost. It also presents additional surfaces prone to oxidation, fouling by deposition of calcium, scale and other impurities, as well as other modes of degradation. In addition, the threads of the valve body in Sloan remain submerged in a volume of water during operation of the vacuum breaker such that the threads are especially prone to corrosion, fouling, and leaking. Because the air and water seats of this vacuum also remain submerged, an acceptable seal cannot be achieved unless water between the valve body and seat is completely displaced.

Finally, any air pocket retained within the valve body disclosed in Sloan is necessarily located above the air chamber seat, the flange of the valve body, and the rubber ring and slip ring which form the seal between the seat and the flange. Hence, the source of buoyancy of the valve body is positioned above the water level within the vacuum breaker. This configuration contributes to the inferiority of the seal because the valve body must be pulled rather than pushed upward, such that the action of the water flowing through the vacuum breaker is less effective in maintaining a good seal.

The present invention is provided to solve these as well as other problems in the prior art.

SUMMARY OF THE INVENTION

A vacuum breaker for use in a fluid supply system is provided. The vacuum breaker comprises a body having an interior, a fluid inlet, a fluid outlet, and an atmospheric air vent. The body is adapted to permit fluid to flow through the interior from the fluid inlet to the fluid outlet. A first seat is disposed within the interior of the body. A bonnet having a second seat communicates with the air vent and the interior. A displacable float cup is disposed between the bonnet and the first seat. The float cup is adapted to be sealingly seated against the second seat when the vacuum breaker is subject to an open flow condition, and to be sealingly seated against the first seat when the vacuum breaker encounters a pressure loss condition. Gaskets are provided to enhance the seal at the first and second seats. Both seats are above a water level within the body of the vacuum breaker. At the open flow condition, the float cup seals the air vent and at the pressure loss condition, the float cup opens the air vent.

A float cup for use in a vacuum breaker is also provided. In one embodiment, the float cup comprises a float cup body having a sealed, internal air pocket and a shroud attached about a periphery of the float cup body. The air pocket is disposed substantially below the shroud. In another embodiment, the float cup comprises a bottom portion and a top portion. The top portion is sonically welded to the bottom portion or, alternatively, the top portion is sonically welded to a shroud, with the shroud being sonically welded to the bottom portion.

The vacuum breaker disclosed herein affords several advantages over prior art devices. Other features and advantages of the invention will become apparent upon consideration of the detailed description of the preferred embodiment taken in conjunction with the following drawings.

BRIEF DESCRIPTION OF THE DRAWINGS

FIG. 1 is a side view of a laboratory faucet incorporating an embodiment of the present invention;

FIG. 2 is an exploded view of an embodiment of the present invention showing various components of the embodiment;

FIG. 3 is a cross-sectional side view of the embodiment of FIG. 2 shown in assembled form;

FIG. 4 is a side cross-sectional view of a float cup bottom according to the present invention;

FIG. 5 is a side cross-sectional view of a float cup top according to the present invention;

FIG. 6 is a side cross-sectional view of a float cup shroud according to the present invention;

DETAILED DESCRIPTION OF THE PREFERRED EMBODIMENT

Figure 7:
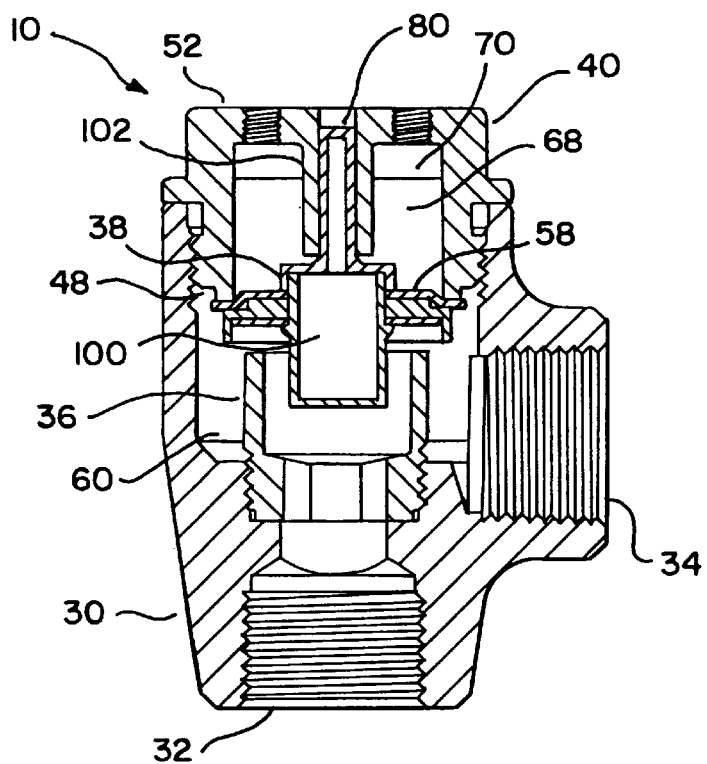
FIG. 7 is a side cross-sectional view of an embodiment of the present showing a float cup in an upper position; and, FIG. 8 is a side cross-sectional view of an embodiment of the present showing a float cup in a lower position.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

More specifically, while the present invention has application in a variety of fluid flow systems, it is particularly useful in laboratory environments. For example, embodiments of the present invention may be installed as an integral part of laboratory water faucet goosenecks. Embodiments may also be used in water supply systems installed in fume hoods, mounted between a remote control water valve and an outlet fitting. The preferred embodiment described below and equivalents thereof are consistently operational at high fluid pressures and over a wide fluid temperature range, e.g., 35 to 160° F.

FIG. 1 shows a vacuum breaker 10 of the present invention installed as part of a gooseneck 12 of a laboratory faucet fixture 14 in a water supply line. The fixture 14 generally consists of a water valve 16, a first pipe 17, a second pipe 18, the vacuum breaker 10 interposed between the first and second pipes 17,18, and a serrated nozzle 20 tapped into the second pipe 18. The first pipe 16 serves as an inlet pipe and the second pipe 18 serves as an outlet pipe for the vacuum breaker 10. A flexible hose 22, shown connected to the serrated nozzle 20 and extending into a sink or basin 24, is used in a wide variety of laboratory activities.

Uniform Plumbing Code Section 1103(n) requires that potable water outlets with hose attachments be protected by a listed atmospheric vacuum breaker installed at least six inches above the highest point of usage, and located on the discharge side of the last valve. Accordingly, the vacuum breaker 10 shown in FIG. 1 is installed downstream of the water valve 16. In addition, the bottom of the vacuum breaker 10 is shown to be installed at least six inches above the flood level rim 26 of the basin 24 into which the water is discharged. Also, the vacuum breaker 10 is shown to be installed at least six inches above the highest point 28 to which the hose 22 can be raised from the basin 24.

FIG. 2 is an exploded view of the various internal components of a preferred embodiment of the vacuum breaker 10. Most of the internal components are contained within a vacuum breaker body 30, which is preferably constructed of brass, plastic (e.g., PVC, polyethylene, or PVDF) or stainless steel. The body 30 has a water inlet 32 and a water outlet 34, both preferably threaded to permit a good connection with the first and second pipes 17 and 18 of the gooseneck 12. A first, or water, seat 36 is installed in the body 30 above the inlet 32. The first seat 36 is preferably constructed of brass, plastic or stainless steel and is threaded. A float cup 38, the details of which are described below, is installed above the first seat 36. The float cup 38 may be constructed of polyethylene or polypropylene. A bonnet 40, preferably constructed from brass, plastic or stainless steel, is threaded into a top 42 of the body 30. To ensure a good seal, an O-ring 44 of suitable resilience and durability such as nylon should be provided above threads 46 of the bonnet 40. The bonnet 40 presents a second, or air, seat 48 to which the float cup 38 may be seated, as described below. A hollow vacuum breaker cap or cover 50 is fastened to an upper portion 52 of the bonnet 40, preferably by means of one or more cover screws 54. The cover 50 is preferably constructed from brass, plastic or stainless steel.

To enhance the ability of the float cup 38 to seal against the first and second seats 36,48, it is preferable to equip the float cup 38 with corresponding first and second gaskets 56,58. The gaskets 56,58 may be constructed of silicone, neoprene, or EPDM.

It will be noted that where the vacuum breaker 10 is intended to be used in a distilled or deionized water line, the metal components should be lined with tin.

FIG. 3 is a cross-sectional view of the assembled vacuum breaker 10. The first seat 36 and float cup 38 are surrounded by an interior water chamber 60 through which water flows from the water inlet 32 to the water outlet 34. The vacuum breaker cover 50 has a plate or top portion 62 through which the cover screws 54 are threaded into the upper portion 52 of the bonnet 40, and a wall portion 64 depending from the top portion 62. The wall portion 64 cooperates with either the bonnet 40 or the body 30 to define a peripheral space 66 through which atmospheric air may be admitted. The peripheral space 66, together with an air chamber 68 enclosed by the bonnet 40, provides an air vent 70 for the vacuum breaker 10.

In the preferred embodiment, the overall dimensions of the vacuum breaker are as follows: the height $H_1$ from an edge 71 of the inlet 32 to the top portion 62 of the vacuum breaker cover 50 is 2¼ inches; the distance $d_1$ from a center axis 72 of the inlet 32 to an edge 74 of the outlet 34 is 1 inch; and the distance $d_2$ from the edge 71 of the inlet 32 to a center axis 76 of the outlet 34 is 1 inch.

The float cup 38 has a unique, closely toleranced, molded three-piece design as shown in FIGS. 4, 5 and 6. The float cup 38 generally includes a bottom 78 (FIG. 4), a top 80 (FIG. 5) and a shroud 82 (FIG. 6). The bottom 78 has a hollow cylinder 84 with an open top 86 and an annular gusset 88. It will be understood that the cylinder 84 may have a tapered or frustoconical profile, as shown in FIG. 3, without departing from the scope of the present invention. In the preferred embodiment, the bottom 78 has a height $H_2$ of 0.486 inch and an internal diameter $D_1$ of 0.281 inch. The top 80 includes a rod-like portion 90, a cap-like portion 92 and a flared portion 94 therebetween. In the preferred embodiment, the top 80 has an overall height $H_3$ of 0.596 inch and the cap-like portion 92 has an internal diameter $D_2$ of 0.343 inch. The shroud 82 includes an annular plate-like portion 96 and a cap-like portion 98. In the preferred embodiment, the shroud 82 has an overall height $H_4$ of 0.154 inch, the plate-like portion 96 has an internal diameter $D_3$ of 0.343 inch, and the cap-like portion 98 has an internal diameter $D_4$ of 0.750 inch.

Figure 8:
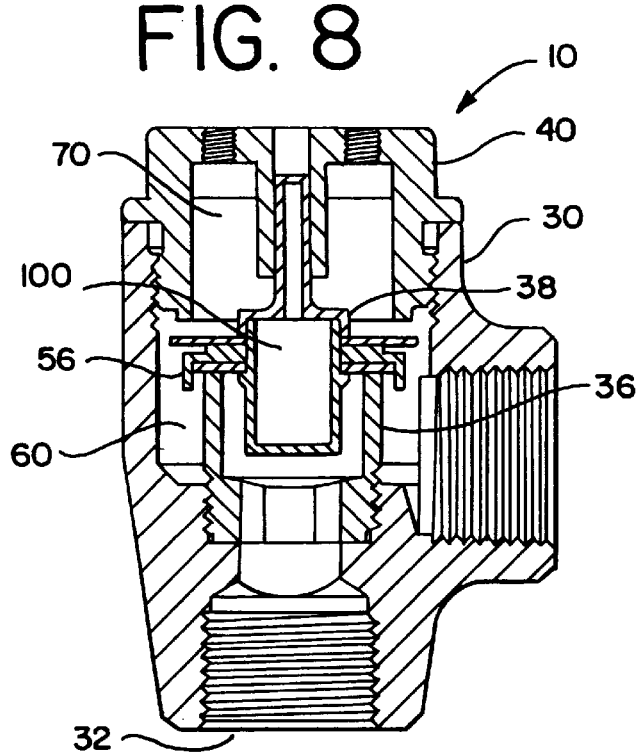

In the construction of the float cup 38, the shroud 82 is placed about the bottom 78 in abutment with the gusset 88. The cap-like portion 92 of the top 80 is then placed over the bottom 78 and the shroud 82 to close the open top 86. The bottom 78, top 80 and shroud 82 are sealed together by means of sonic welding. By sonically welding the top 80 to the bottom 78, a small, permanent, internal air pocket 100 is created as best shown in FIGS. 7 and 8. Alternatively, the top 80 could be sonically welded directly to the shroud 82 to create the air pocket 100. The air pocket 100 increases the buoyancy of the float cup 38, the advantage of which is described below. In the preferred embodiment, the first gasket 56 (not shown in FIGS. 4–6) is placed about the cylinder 84 of the bottom 78 within the confines of the cap-like portion 98 of the shroud 82; the second gasket 58 is placed on top of the shroud 82 about the cap-like portion 92 of the top 80.

It will be understood that while the preferred construction of the float cup 38 utilizes sonic welding techniques, it is possible to provide alternative means for connecting the portions of the float cup 38, such as a snap-fitted or threaded construction. However, the quality of the seal resulting from these latter constructions may be inferior to that of the sonically welded construction disclosed herein.

The operation of the vacuum breaker 10 will now be described with reference to FIGS. 7 and 8. The float cup 38 is displacable under the influence of water pressure between the extreme upper position shown in FIG. 7 and the extreme lower position shown in FIG. 8. The bonnet 40 has a hollow sleeve or channel 102 extending from the upper portion 52 into the air chamber 68. In the assembly of the vacuum breaker 10, the top 80 of the float cup 38 is inserted into the channel 102. The channel 102 thus assists in guiding the float cup 38 as the float cup 38 is displaced between the upper and lower positions.

FIG. 7 illustrates the vacuum breaker 10 when subject to an open flow condition. When the water valve 16 (FIG. 1) is opened, the water pushes the float cup 38 off the first seat 36 and against the second seat 48 of the bonnet 40. A good seal is established through the assistance of the second gasket 58. The water is permitted to flow into the inlet 32, through the first seat 36, through the water chamber 60, and out the outlet 34. Because the air chamber 68 is sealed off by the float cup 38 and second gasket 58, air is prevented from entering the water chamber 60. In addition, water is prevented from flooding the atmospheric air vent 70 defined by the air chamber 68 and peripheral space 66 (see FIG. 3) and spilling out from underneath the vacuum breaker cover 50 (see FIG. 3).

The design of the float cup 38 renders the vacuum breaker 10 leak-proof not only at high water pressure conditions but even at very low water pressure conditions, such as during a laboratory procedure requiring the water valve 16 to remain slightly opened for an extended period of time. In prior art vacuum breakers subject to low pressure conditions, there often is not enough water flowing through the gooseneck and into the vacuum breaker to cause the prior art float cup, or other valve member used, to seat positively and close against the bonnet. Consequently, water was permitted to seep around the float cup and leak out from the air vent. By comparison, in the float cup 38 of the present invention, the presence of the sealed air pocket 100 sufficiently increases the buoyancy of the float cup 38 to maintain the float cup 38 substantially centered over the first seat 36 and on top of the water level (not shown) within the vacuum breaker 10 at all times and at very low flow. Moreover, the positioning of the air pocket substantially below the second seat 48 and the shroud 82 effects an improved, complete seal of the air chamber 68. The improved seal is due in part to the pushing action imparted on the float cup 38 during a flow condition. This is a vast improvement over the pulling action that occurs in prior art float cups having an air pocket located above the air seat.

FIG. 8 illustrates the vacuum breaker 10 when subject to a sudden water pressure loss condition. In the event of a loss of water pressure on the upstream side of the vacuum breaker 10 and the resulting creation of a negative pressure in the water supply line, the float cup 38 drops down onto the first seat 36. A good seal is established through the assistance of the first gasket 56. The float cup 38 and the first gasket 56 cooperatively act as a check valve, closing off the inlet 32 from the water chamber 60 and significantly reducing or eliminating backflow. The displacement of the float cup 38 also opens the air vent 70 to admit air into the discharge line downstream of the vacuum breaker 10, thereby preventing the creation of a vacuum and stopping any back-siphonage.

It will be understood that the vacuum breaker 10 of the present invention may be incorporated, without undue modification or experimentation, into fluid flow systems other than water supply lines where back-siphonage conditions are undesirable. s While the specific embodiment has been illustrated and described, numerous other modifications come to mind without significantly departing from the spirit of the invention, and the scope of protection is only limited by the scope of the accompanying claims.

What is claimed is:

1. A vacuum breaker for use in a fluid supply system comprising:

a body having an interior, a fluid inlet, a fluid outlet, and an atmospheric air vent, the body adapted to permit fluid to flow through the interior from the fluid inlet to the fluid outlet;

a first seat disposed within the interior;

a bonnet having a second seat disposed above the first seat and communicating with the air vent and the interior; and, a displacable float cup having a sealed internal air pocket disposed substantially below the second seat, the float cup disposed between the bonnet and the first seat and adapted to be sealingly seated against the second seat when the vacuum breaker is subject to an open flow condition, wherein at least a portion of the air pocket is disposed within the fluid inlet substantially below an upper end of the first seat when the float cup is sealingly seated against the second seat, and adapted to be sealingly seated against the first seat when the vacuum breaker encounters a pressure loss condition, wherein at the open flow condition the float cup seals the air vent and at the pressure loss condition the float cup opens the air vent.

2. The vacuum breaker of claim 1 wherein the float cup is adapted to be pushed off the first seat and seal against the second seat under the influence of fluid flow through the fluid inlet.

3. The vacuum breaker of claim 1 wherein the air pocket is maintained by a sonically welded seal.

4. The vacuum breaker of claim 1 further including a shroud attached to the float cup about a periphery of the float cup.

5. The vacuum breaker of claim 4 wherein a portion of the air pocket is disposed substantially below the shroud.

6. The vacuum breaker of claim 1 further including a first gasket disposed about the float cup and adapted for assisting the float cup in sealingly seating against the first seat.

7. The vacuum breaker of claim 6 wherein the first gasket and the second seat are disposed above a fluid level in the interior.

8. The vacuum breaker of claim 6 further including a second gasket disposed about the float cup and adapted for assisting the float cup in sealing the air vent.

9. The vacuum breaker of claim 1 wherein the float cup remains above a fluid level in the interior during low flow conditions.

10. The vacuum breaker of claim 1 further including a cover having atop portion attached to the bonnet outside the body and a wall portion depending from the top portion, wherein the air vent includes a peripheral space defined by the wall portion and the bonnet.

11. The vacuum breaker of claim 1 wherein the bonnet is adapted to guide the displacement of the float cup.

12. The vacuum breaker of claim 1 wherein the bonnet includes an air chamber.

13. The vacuum breaker of claim 1 wherein the float cup is constructed of polyethylene.

14. The vacuum breaker of claim 1 wherein the float cup is constructed of polypropylene.

15. A float cup for use in a vacuum breaker and adapted to seal an air vent, the float cup comprising:

a float cup body having a sealed, internal air pocket; and, a shroud disposed about a periphery of the float cup body, wherein the air pocket is at least partially disposed below the shroud and adapted to protrude into a fluid inlet when in an open flow condition.

16. The float cup of claim 15 wherein the float cup body includes a bottom portion and a separate top portion.

17. The float cup of claim 16 wherein the bottom portion is hollow.

18. The float cup of claim 16 wherein the bottom portion is sealed to the top portion.

19. The float cup of claim 16 wherein the shroud is sealed to the bottom portion and the top portion is sealed to the shroud.

20. The float cup of claim 16 wherein the top portion includes an elongated region adapted for movable communication with a guide means of the vacuum breaker.

21. The float cup of claim 15 wherein the air pocket is maintained by a sonically welded seal.

22. The float cup of claim 15 wherein the float cup body and the shroud are constructed of polyethylene.

23. The float cup of claim 15 wherein the float cup body and the shroud are constructed of polypropylene.

* * * * *